United States Patent
Edwards et al.

(10) Patent No.: US 10,623,090 B2
(45) Date of Patent: Apr. 14, 2020

(54) MULTI-LANE OPTICAL TRANSPORT NETWORK RECOVERY

(71) Applicant: AT&T Intellectual Property I, L.P., Atlanta, GA (US)

(72) Inventors: Andrew Edwards, Morganville, NJ (US); Martin Birk, Holmdel, NJ (US); Kathleen Tse, Holmdel, NJ (US); Gary Armiento, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/988,377

(22) Filed: May 24, 2018

(65) Prior Publication Data

US 2019/0363787 A1  Nov. 28, 2019

(51) Int. Cl.
*H04B 10/40* (2013.01)
*H04B 10/038* (2013.01)
*H04L 12/26* (2006.01)
*H04B 10/079* (2013.01)
*H04L 12/703* (2013.01)
(Continued)

(52) U.S. Cl.
CPC ....... *H04B 10/038* (2013.01); *H04B 10/0791* (2013.01); *H04B 10/40* (2013.01); *H04L 41/0672* (2013.01); *H04L 41/0896* (2013.01); *H04L 43/0847* (2013.01); *H04L 43/16* (2013.01); *H04L 45/22* (2013.01); *H04L 45/28* (2013.01)

(58) Field of Classification Search
CPC .. H04B 10/038; H04B 10/40; H04B 10/0791; H04L 45/22; H04L 41/0896; H04L 41/0672; H04L 45/28; H04L 43/0847; H04L 43/16

USPC .................. 398/9–38, 43–103, 135–139
See application file for complete search history.

(56) References Cited

U.S. PATENT DOCUMENTS 5,731,887 A * 3/1998 Fee ..................... H04J 14/0291
                                                            370/225
5,777,761 A * 7/1998 Fee ..................... H04J 14/0291
                                                            370/225
(Continued)

FOREIGN PATENT DOCUMENTS

KR         101036939         5/2011

*Primary Examiner* — Dibson J Sanchez
(74) *Attorney, Agent, or Firm* — Hartman & Citrin LLC

(57) ABSTRACT

Concepts and technologies for multi-lane optical transport network recovery are provided herein. In an embodiment, a system includes a multi-lane optical transceiver. The multi-lane optical transceiver can include a transmitter optical sub-assembly, a receiver optical sub-assembly, and a controller that includes a processor and a memory that stores computer-executable instructions that, in response to execution by the processor, cause the processor to perform operations. The operations can include detecting an optical interruption event corresponding to an optical lane within a multi-lane optical path. The operations can further include instantiating an optical protocol alarm based on the optical interruption event. The operations can further include generating an optical protocol message based on the optical protocol alarm. The operations can further include instructing a peer multi-lane optical transceiver to alter optical transmission along the multi-lane optical path based on the optical protocol message.

20 Claims, 6 Drawing Sheets

(51) Int. Cl.
*H04L 12/24* (2006.01)
*H04L 12/707* (2013.01)

(56) References Cited

U.S. PATENT DOCUMENTS

| | | | | |
|---|---|---|---|---|
| 6,005,694 | A * | 12/1999 | Liu | H04B 10/071 398/20 |
| 6,081,359 | A * | 6/2000 | Takehana | H04J 14/02 398/1 |
| 6,172,782 | B1 * | 1/2001 | Kobayashi | H04J 14/02 370/219 |
| 6,324,318 | B1 * | 11/2001 | Suzuki | H04J 14/0221 385/1 |
| 6,915,075 | B1 * | 7/2005 | Oberg | H04J 14/0279 398/45 |
| 6,917,763 | B1 * | 7/2005 | Au | H04B 10/0771 398/13 |
| 7,099,578 | B1 * | 8/2006 | Gerstel | H04J 14/0295 398/33 |
| 7,233,738 | B2 * | 6/2007 | Kerfoot, III | H04J 14/029 398/10 |
| 7,711,267 | B2 * | 5/2010 | Wellbrock | H04L 43/0847 398/17 |
| 7,730,376 | B2 * | 6/2010 | Das Sharma | G06F 11/0751 714/712 |
| 7,822,110 | B1 * | 10/2010 | Doblar | H04B 3/466 375/224 |
| 7,877,008 | B2 * | 1/2011 | Li | H04J 14/0227 398/19 |
| 8,693,864 | B2 * | 4/2014 | Kubo | H04B 1/74 398/7 |
| 8,792,332 | B2 | 7/2014 | Heckendorf et al. | |
| 8,798,454 | B2 | 8/2014 | Akasaka | |
| 8,983,286 | B2 * | 3/2015 | Youn | H04B 10/032 398/118 |
| 9,059,815 | B2 * | 6/2015 | Abdul Manaf | H04J 14/0293 |
| 9,100,112 | B1 * | 8/2015 | Leong | G06F 11/27 |
| 9,148,229 | B2 | 9/2015 | Komaki | |
| 9,413,454 | B1 | 8/2016 | Reddy Bovilla et al. | |
| 9,455,779 | B2 * | 9/2016 | Boduch | H04B 10/032 |
| 9,519,331 | B2 | 12/2016 | Khatri et al. | |
| 9,608,722 | B2 | 3/2017 | Liu et al. | |
| 9,787,423 | B2 | 10/2017 | Nagarajan | |
| 9,859,974 | B2 | 1/2018 | Guduru | |
| 9,882,633 | B2 * | 1/2018 | Schmidt | H04B 10/03 |
| 10,003,430 | B2 * | 6/2018 | Shimizu | H04J 14/0221 |
| 10,027,421 | B2 * | 7/2018 | Binkai | H04J 14/0256 |
| 2005/0105900 | A1 * | 5/2005 | Akimoto | H04B 10/03 398/16 |
| 2006/0024058 | A1 * | 2/2006 | Nabeyama | H04B 10/032 398/79 |
| 2006/0212775 | A1 * | 9/2006 | Cypher | H03M 13/09 714/758 |
| 2008/0253295 | A1 * | 10/2008 | Yumoto | H04L 43/0811 370/245 |
| 2008/0304825 | A1 * | 12/2008 | Mahony | H04Q 11/0067 398/38 |
| 2010/0162033 | A1 * | 6/2010 | Ahn | G06F 11/2007 714/4.1 |
| 2010/0178050 | A1 * | 7/2010 | Nakashima | H04B 10/032 398/5 |
| 2010/0183294 | A1 * | 7/2010 | Villarruel | H04B 10/032 398/10 |
| 2010/0215359 | A1 * | 8/2010 | Li | H04B 10/40 398/22 |
| 2010/0254704 | A1 * | 10/2010 | Aoki | H04B 10/40 398/45 |
| 2011/0116790 | A1 * | 5/2011 | Sakauchi | H04J 14/0204 398/5 |
| 2011/0228861 | A1 * | 9/2011 | Nagano | G06F 11/0745 375/259 |
| 2011/0261682 | A1 * | 10/2011 | Han | H04L 12/413 370/225 |
| 2011/0265139 | A1 * | 10/2011 | Singh | H04N 21/64322 725/116 |
| 2011/0311217 | A1 * | 12/2011 | Horiuchi | H04J 14/0297 398/5 |
| 2012/0044800 | A1 * | 2/2012 | Coltro | H04J 3/14 370/217 |
| 2012/0066531 | A1 * | 3/2012 | Shafai | H04W 52/0206 713/323 |
| 2012/0237199 | A1 * | 9/2012 | Akiyama | H04J 3/14 398/2 |
| 2012/0294623 | A1 * | 11/2012 | Lee | H04J 14/0221 398/135 |
| 2013/0121683 | A1 * | 5/2013 | Nagamine | H04L 41/0677 398/2 |
| 2013/0195440 | A1 * | 8/2013 | Tominaga | H04J 14/0275 398/2 |
| 2014/0003283 | A1 * | 1/2014 | Koenen | H04L 41/0896 370/254 |
| 2014/0056582 | A1 * | 2/2014 | Roberts | H04B 10/07955 398/20 |
| 2014/0064721 | A1 * | 3/2014 | Wang | H04B 10/2503 398/5 |
| 2014/0286634 | A1 * | 9/2014 | Tsuiki | H04B 10/032 398/5 |
| 2015/0278040 | A1 * | 10/2015 | Sikkink | G06F 13/4022 714/5.1 |
| 2015/0280854 | A1 * | 10/2015 | Matsukawa | H04J 14/022 398/3 |
| 2016/0037242 | A1 | 2/2016 | Su et al. | |
| 2016/0182154 | A1 * | 6/2016 | Fang | H04B 10/2575 398/116 |
| 2016/0241332 | A1 | 8/2016 | Takemoto et al. | |
| 2016/0344470 | A1 * | 11/2016 | Reddy Bovilla | H04B 10/03 |
| 2017/0090957 | A1 * | 3/2017 | Sadowski | G06F 9/44505 |
| 2018/0006925 | A1 * | 1/2018 | Bohra | H04L 43/08 |

* cited by examiner

MULTI-LANE OPTICAL TRANSPORT NETWORK RECOVERY

BACKGROUND

Conventional telecommunication networks have historically relied on the transmission of electrical signals as the sole means to pass information across vast distances. As smart phones and other portable devices increasingly become ubiquitous, and data usage increases, the conventional wired and wireless infrastructure can require higher bandwidth capability in order to address the increased demand. To receive additional mobile and fixed communication bandwidth, most homes and businesses have grown to rely on broadband data access for services such as voice, video, and access to the Internet. An effort to further increase bandwidth has resulted in the implementation of optical networks to rapidly convey large amounts of information between remote points at speeds that were historically not possible to achieve. However, conventional implementations of optical networks can have points of weakness that can leave the optical network vulnerable to communication failure, thereby potentially causing user complaints and a reduction of communicative transmissions. For example, optical fibers may be cut, portions of the optical fibers may no longer function, and/or transmission and receiving devices of the optical networks may not function properly. In conventional optical networks, faults, errors, interruptions, and/or malfunctions can cause the conventional optical networks to cease all communications using the optical connection and inhibit all communication between remote points that were communicatively coupled by the optical fiber, irrespective of the functioning of other elements within the conventional optical network. As such, conventional implementations and conventional mechanisms to enable an optical network to recover from faults, errors, and/or interruptions have not provided a reliable and efficient use of network resources.

SUMMARY

The present disclosure is directed to multi-lane optical transport network recovery that can enable continued optical network functionality following the occurrence of errors, faults, interruptions, and/or data loss within at least a portion of an optical transport network. According to one aspect of the concepts and technologies disclosed herein, a system is described. The system can include a multi-lane optical transceiver that is communicatively coupled to a peer multi-lane optical transceiver via a multi-lane optical path. In an embodiment, the multi-lane optical transceiver can include a transmitter optical sub-assembly and a receiver optical sub-assembly. The transmitter optical sub-assembly can include a plurality of optical transmitters, and the receiver optical sub-assembly can include a plurality of optical receivers. In some embodiments, an optical receiver can include a photonic diode. In some embodiments, an optical transmitter can include an optical device driver, such as but not limited to, one or more of a laser device driver and/or a light emitting diode device driver. The multi-lane optical transceiver also can include a power supply that can provide power to at least the transmitter optical sub-assembly and the receiver optical sub-assembly. In various embodiments, the multi-lane optical transceiver can further include a controller that includes a processor and a memory that stores computer-executable instructions. In response to execution of the computer-executable instructions by the processor, the processor can be caused to perform operations that include detecting an optical interruption event corresponding to an optical lane within a multi-lane optical path. The operations can further include instantiating an optical protocol alarm based on the optical interruption event. The operations can further include generating an optical protocol message based on the optical protocol alarm. The operations can further include instructing a peer multi-lane optical transceiver to alter optical transmission along the multi-lane optical path based on the optical protocol message.

In some embodiments, the multi-lane optical path can include the optical lane corresponding to the optical interruption event and a plurality of optical lanes that do not correspond with the optical interruption event. In some embodiments, the optical protocol message instructs the peer multi-lane optical transceiver to alter optical transmission by routing data through the plurality of optical lanes that do not correspond with the optical interruption event. In some embodiments, power is maintained to an optical transmitter of the multi-lane optical transceiver that is associated with the optical lane that corresponds with the optical interruption event, but data is not provided to the optical transmitter until the optical interruption event is no longer detected. In some embodiments, the optical protocol message instructs the peer multi-lane optical transceiver to alter optical transmission by throttling bandwidth of the multi-lane optical path to below a bandwidth minimum threshold. In some embodiments, the detection of the optical interruption event includes determining that data transmission via the optical lane is interrupted for at least a time period. In some embodiments, detecting the optical interruption event includes determining that a wavelength is not detected for the optical lane from the multi-lane optical path. In some embodiments, the optical protocol message can include an optical transmission command that alters a transmission configuration implemented by the peer multi-lane optical transceiver.

According to another aspect of the concepts and technologies disclosed herein, a method is disclosed. The method can include detecting, by a multi-lane optical transceiver, an optical interruption event corresponding to an optical lane within a multi-lane optical path. The method can further include instantiating, by the multi-lane optical transceiver, an optical protocol alarm based on the optical interruption event. The method can further include generating, by the multi-lane optical transceiver, an optical protocol message based on the optical protocol alarm. The method can further include instructing, by the multi-lane optical transceiver, a peer multi-lane optical transceiver to alter optical transmission along the multi-lane optical path based on the optical protocol message.

In some embodiments, the multi-lane optical path can include the optical lane corresponding to the optical interruption event and a plurality of optical lanes that do not correspond with the optical interruption event. In some embodiments, the optical protocol message instructs the peer multi-lane optical transceiver to alter optical transmission by routing data through the plurality of optical lanes that do not correspond with the optical interruption event. In some embodiments, power can be maintained to a transmitter of the multi-lane optical transceiver that is associated with the optical lane that corresponds with the optical interruption event. In some embodiments, the optical protocol message instructs the peer multi-lane optical transceiver to alter optical transmission by throttling bandwidth of the multi-lane optical path to below a bandwidth minimum threshold. In some embodiments, detection of the optical interruption event includes determining that a data transmission via the optical lane is interrupted for at least a time period. In some embodiments, detection of the optical interruption event includes determining that a wavelength is not detected for the optical lane from the multi-lane optical path. In some embodiments, the optical protocol message can include an optical transmission command that alters a transmission configuration implemented by the peer multi-lane optical transceiver.

According to yet another aspect, a computer storage medium is disclosed. The computer storage medium can have computer-executable instructions stored thereon. In some embodiments, the computer storage medium can be included within a multi-lane optical transceiver. When the computer-executable instructions are executed by a processor, the processor can perform operations. The operations can include detecting an optical interruption event corresponding to an optical lane within a multi-lane optical path. The operations can further include instantiating an optical protocol alarm based on the optical interruption event. The operations can further include generating an optical protocol message based on the optical protocol alarm. The operations can further include instructing a peer multi-lane optical transceiver to alter optical transmission along the multi-lane optical path based on the optical protocol message. In some embodiments, the multi-lane optical path can include the optical lane corresponding to the optical interruption event and a plurality of optical lanes that do not correspond with the optical interruption event. In some embodiments, the optical protocol message instructs the peer multi-lane optical transceiver to alter optical transmission by routing data through the plurality of optical lanes that do not correspond with the optical interruption event. In some embodiments, power can be maintained to a transmitter of the multi-lane optical transceiver that is associated with the optical lane that corresponds with the optical interruption event. In some embodiments, the optical protocol message instructs the peer multi-lane optical transceiver to alter optical transmission by throttling bandwidth of the multi-lane optical path to below a bandwidth minimum threshold. In some embodiments, detection of the optical interruption event includes determining that data transmission via the optical lane is interrupted for at least a time period. In some embodiments, detecting the optical interruption event includes determining that a wavelength is not detected for the optical lane from the multi-lane optical path.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
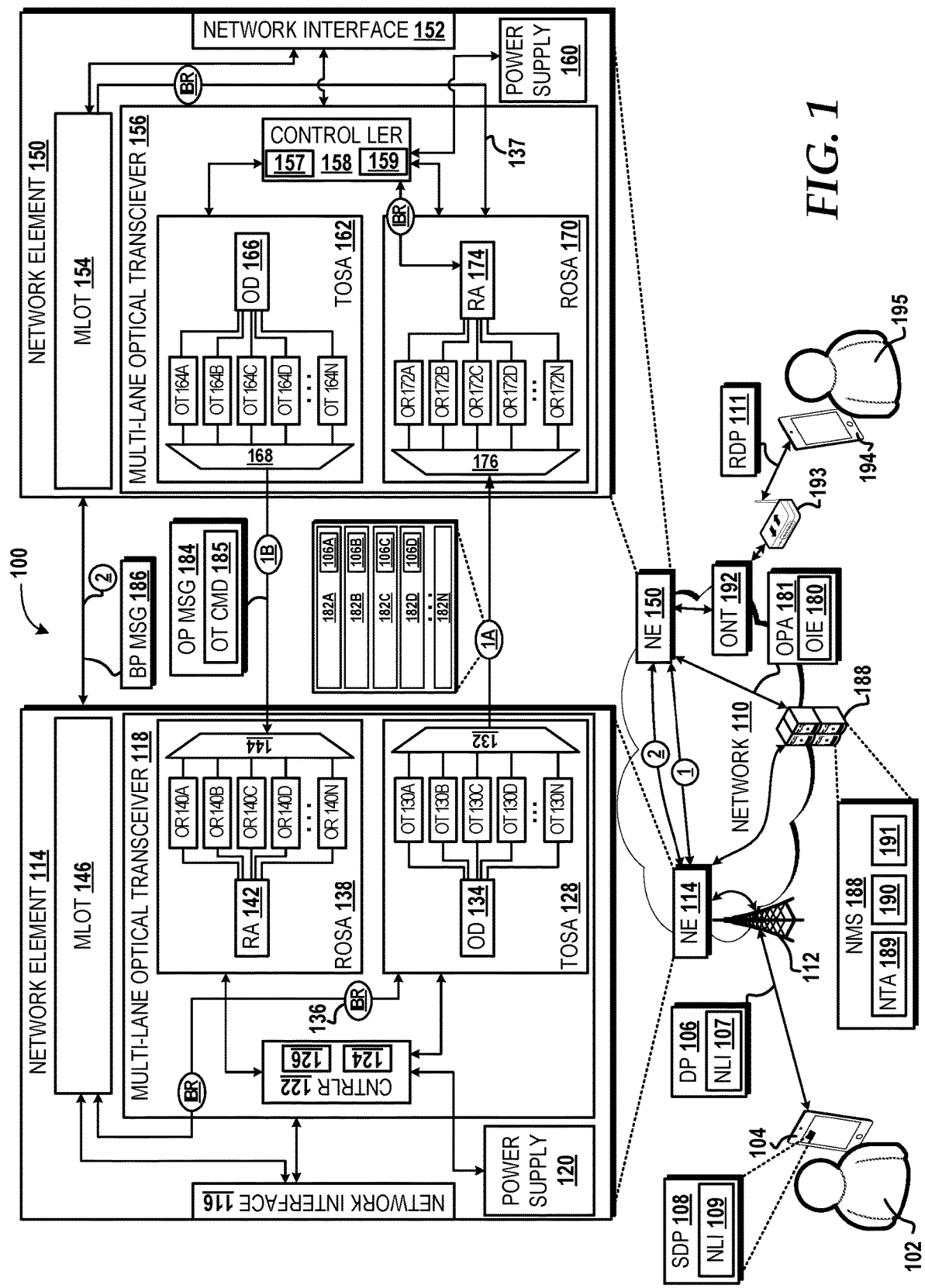
FIG. 1 is a system diagram illustrating an operating environment for multi-lane optical transport network recovery, according to various embodiments of the concepts and technologies described herein.

The following detailed description is directed to multi-lane optical transport network service recovery. Conventionally, when an optical lane within a multi-lane optical path experiences an interruption and/or failure, such as due to a malfunction or failure of an optical transmitter, a conventional network element may consider the entire multi-lane optical path to be faulty and cease all communications along the multi-lane optical path. Concepts and technologies discussed herein enable recovery from a communicative interruption and/or failure without ceasing all communications along the multi-lane optical path. In various embodiments, a system can include various network elements that can collectively operate to perform optical transport functions within a communications network so as to relay and provide communication coupling to users of the network. In some instances, two or more network elements may be considered "peers" to each other based on the relative connection, communicative coupling, and communicative functions performed with each other via one or more multi-lane optical paths. For example, a communications network can include an optical transport network that includes the use of one or more network elements that provide a housing or backbone for one or more multi-lane optical transceivers that can communicatively couple with "peer" multi-lane optical transceivers within another network element via one or more multi-lane optical paths.

When a data package is routed to the network element, the data package may be sent to a sending multi-lane optical transceiver of the network element, where the data package is segmented, and each data package segment is assigned to a wavelength associated with one optical lane within a multi-optical path. Each data package segment can be distributed by the first multi-lane optical transceiver to a peer network element, where a receiving multi-lane optical transceiver may receive the data package segments. In various embodiments, the sending multi-lane optical transceiver (in this example referred to as the first multi-lane optical transceiver), may not be able to detect malfunctions (e.g., misfires, failures, or faults) that occur within an optical lane of the multi-lane optical path. Embodiments of the present disclosure enable the receiving multi-lane optical transceiver (in this example referring to the multi-lane optical transceiver that receives the data package segments) to detect the occurrence of an optical interruption corresponding to the use of one or more optical lanes, which can be referred to as an "optical interruption event". The receiving multi-lane optical transceiver can instantiate an optical protocol alarm based on the detection of the optical interruption event so as to relay to a network management system that the optical interruption event (e.g., a loss of wavelength due to a faulty portion of fiber optics, a malfunction with a sending optical transmitter, or other detected optical malfunction) has occurred corresponding to at least one optical lane within the multi-lane path. The receiving multi-lane optical transceiver can generate an optical protocol message that is configured to instruct the sending multi-lane optical transceiver to alter how data is optically transmitted to the receiving network element through one or more transmission actions. For example, the optical protocol message can be configured to include an optical transmission command that, in some embodiments, can instruct the sending multi-lane optical transceiver to route all segments of a data package through the plurality of optical lanes that do not correspond with the optical interruption event. In some embodiments, the transmission actions also can include instructing the multi-lane optical transceiver to maintain power to the optical transmitter corresponding to the optical lane which experienced the optical interruption event but not transmit data from the data package along the optical lane corresponding to the optical interruption event. Although power can be maintained, the data may not be routed through the optical transceiver and the optical lane that is associated with the optical interruption event until the optical interruption event is no longer detected. In some embodiments, the transmission actions can include throttling bandwidth of the multi-lane optical path to below a bandwidth minimum threshold, such as a bandwidth originally defined by an original equipment manufacturer, a network policy definition, or other specification. In some embodiments, the transmission actions can include invoking an internal bypass route so that instead of sending all segments of current and/or subsequent data packages along the multi-lane optical path having the faulty optical lane, at least some or all of the segments of the current or subsequent data package may be routed along a second multi-lane optical path corresponding to another multi-path optical transceiver in communication with the receiving network element, thereby allowing the receiving network element to reassemble the data using one or more multi-lane optical paths and transmit the reassembled data package to a point of destination, such as a user equipment. In some embodiments, the transmission actions can include activation of a reserve optical transmitter so as to restore the multi-lane optical path that was in use prior to the detection of the optical interruption event. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for enabling multi-lane optical transport network recovery will be described, according to an illustrative embodiment. The operating environment 100 shown in FIG. 1 includes a user equipment 104 associated with a user 102, a user equipment 194 associated with a user 195, and a communications network ("network") 110 that can communicatively couple the user equipment 104 with the user equipment 194. In the embodiment illustrated in FIG. 1, the network 110 can include a network access point 112, a network element 114, a network element 150, a multi-lane optical path ("MLOP") 1, a MLOP 2, a network management system 188, an optical network terminal 192, and an access point 193.

In various embodiments, the network 110 can be operated, in whole or in part, by a communications service provider that enables a communication service to be offered to customers, such as one or more of the user 102 and/or the user 195, via network access from the customer's equipment, such as the user equipment 104 and the user equipment 194, respectively. The communication of data between one or more of the user equipment 104 and/or the user equipment 194, and amongst network elements of the network 110, may be referred to as network traffic. For example, in an embodiment, the user 102 may want to communicate with the user 195 by using the user equipment 104 to send a data package 106 to the user equipment 194 via the network 110. In various embodiments, the network 110 can include all or a portion of a public switched telephone network, a public data network, a private data network, a local area network, a wide area network, a metropolitan area network, a local, regional, and/or global communication or computer network, an optical transport network, an enterprise network, a wireline, any combination thereof, or the like. The network 110 can include an optical transport network that can, in some embodiments, provide high-speed bandwidth (e.g., at least 400 Gb/s or at least 1 Tb/s through the network 110) while also reducing data loss over long distances when compared to conventional wired electrical networks. It is understood that the network 110 can support communications service via optical and non-optical transport components. Further discussion of embodiments of the network 110 is provided with reference to FIG. 3. Similarly, further discussion of an embodiment of a configuration for the user equipment 104 and the user equipment 194 are provided with reference to FIG. 5. It is understood that the examples provided are for illustration purposes only, and therefore should not be construed as limiting in any way.

In various embodiments, the data package 106 can be transmitted via a wired and/or wireless communication link to, within, and/or from the network 110. The data package 106 can be sent from an application and/or operating system of the user equipment 104. In some embodiments, the data package 106 can be configured to support a communication service, such as a WiFi call, a video call, a texting session, a session of video content, an email, or any other data structure used in data transmission. The data package 106 can be routed from the user equipment 104 to the network access point 112. In some embodiments, the network access point 112 may serve as a provider edge device that enables various communication devices, such as the user equipment 104, to access the network 110. In some embodiments, the user equipment 104 may also send a subsequent data package 108, which may be configured substantially similar to the data package 106, but was sent from the user equipment 104 at a time after the data package 106 was sent to network element 114 within the network 110 via the network access point 112.

The network access point 112 can be communicatively coupled to the network element 114. Although only two access points are shown (e.g., the network access point 112 and the access point 193), the network 110 can support multiple access points configured the same as or similar to the network access points 112, 193. The network access points 112, 193 can provide wired and/or wireless communicative coupling and can include, but should not be limited to, one or more of a base transceiver station, a wireless router, a femtocell, an eNode B, a NodeB, a gNodeB (i.e., an access point that incorporates new radio access technology, such as LTE Advanced and other 5G technology), a multi-standard metro cell node and/or other network nodes or combinations thereof that are capable of providing communication to and/or from the network 110. As illustrated in FIG. 1, the access point 193 is configured in the form of a wireless router that is communicatively coupled to the optical network terminal 192, however it is understood that this may not be the case in all embodiments. The optical network terminal 192 can provide circuitry that enables a transition from fiber optical communication to electrical communication so that the access point 193 is able to process and relay communications to the user equipment 194, such as any of the data package 106, the subsequent data package 108, and/or a reassembled data package 111. In some embodiments, the network access points 112, 193 and/or the optical network terminal 192 may be referred to as provider edge devices and may be included as a part of a communication service provided to one or more users. It is understood that the examples provided are for illustration purposes only, and therefore should not be construed as limiting in any way.

The network 110 can include a plurality of network elements that can include any system, apparatus, and/or networking device (whether virtual or physical) that may be configured to route and handle traffic through, to, and/or from the network 110. Examples of network elements, such as the network element 114 and the network element 150, can include, but should not be limited to, routers, switches, server hubs, optical add-drop multiplexers, gateways, or other devices that can facilitate communication services for the network 110. In the embodiment illustrated in FIG. 1, the network element 114 and the network element 150 may provide a host computer system or other compute, store, and/or networking resources that can support the communicative functions described herein. Although only two network elements are illustrated in FIG. 1, it is understood that more than two network elements may be included within the network, according to various embodiments. In various embodiments, the network element 114 and the network element 150 can convert electrical signals received from a non-optical component of the network 110, into optical signals, and similarly can convert optical signals into electrical signals.

The network element 114 can be communicatively coupled to the network element 150 via one or more multi-lane optical paths, such as the MLOP 1 and the MLOP 2. A multi-lane optical path, such as the MLOP 1 and the MLOP 2, includes a communication link that has a plurality of optical lanes so as to establish one or more communication channels between peer devices (e.g., between two multi-lane optical transceivers) through the use of one or more optical fibers and/or optical connections. Each of the MLOP 1 and the MLOP 2 can include a plurality of optical lanes. An optical lane is at least a portion of an optical fiber strand and/or optical connection that provides a channel of communication corresponding to a specific wavelength for communicative coupling. The wavelength corresponding to each optical lane can be measured in nanometers ("nm"). In some embodiments, the wavelength can correspond with at least one wavelength within an "O-Band" (i.e., 1260 nm-1360 nm), an "E-Band" (i.e., 1360 nm-1460 nm), "S-Band" (i.e., 1460 nm-1530 nm), a "C-Band" (i.e., 1530 nm-1565 nm), or an "L-Band" (i.e., 1565 nm-1625 nm). In some embodiments, wavelengths corresponding to each optical lane can be interspaced in a defined channel spacing distance (e.g., between 20 nm spacing, 0.4 nm spacing, 0.8 nm, or other configuration). In some embodiments, multiple optical lanes (with each optical lane corresponding to a particular wavelength) can be combined into at least one multi-lane optical path via wavelength division multiplexing and/or dense wavelength division multiplexing. In some embodiments, the optical lane can be unidirectional and/or bidirectional, where unidirectional enables transmission of data only in one direction (i.e., transmit or receive) between peer devices, and bidirectional enables transmission of data in two directions (i.e., transmit and receive) between peer devices.

As illustrated in FIG. 1, the MLOP 1 can include a portion 1A and a portion 1B. In some embodiments, the portion 1A and the portion 1B of the MLOP 1 may correspond with distinct optical lanes used for transmission in each direction so as to provide bidirectional communication. In other embodiments, the portion 1A and the portion 1B of the MLOP 1 may correspond with the same optical lanes used for transmission in each direction, where the transmissions on the same optical lanes occur at separate times so as not to interfere with each other. It is understood that the MLOP 1 and the MLOP 2 may be provided via one or more optical fiber strands and one or more optical connector interfaces. Examples of optical fiber strands that can be used to provide at least a portion of the MLOP 1 and/or the MLOP 2 can include, but should not be limited to, a single-mode optical fiber, an enhanced large effective area optical fiber, a reduced slope optical fiber, a multimode optical fiber, or other optical fiber known to one of ordinary skill.

In an embodiment, the MLOP 1 includes a plurality of optical lanes 182A-182N. For clarity, the plurality of optical lanes 182A-182N corresponds with the portion 1A of the MLOP 1, where 182N corresponds with an "N" number of optical lanes that can vary dependent on the particular configuration of the transmitting and receiving multi-lane optical transceivers. In various embodiments, each of the optical lanes 182A-182N corresponds with one or more specific, distinct wavelength(s). It is understood that increasing the number of optical lanes within the MLOP 1 and/or the MLOP 2 can, in some embodiments, increase the bandwidth (such as measured in Gb/s) of the multi-lane optical path. When an optical lane is active (i.e., providing data transmission along the optical lane that is used by the receiving multi-lane optical transceiver), then each optical lane can provide or otherwise be associated with a lane bandwidth (measured in Gb/s), and the cumulative number of optical lanes that are active can provide an aggregated data bandwidth, referred to as a "MLOP bandwidth". For example, in an embodiment, if the MLOP 1 has four active optical lanes, with each optical lane having a lane bandwidth of 100 Gb/s, then the MLOP 1 would have an MLOP bandwidth of 400 Gb/s (i.e., aggregation of four 100 Gb/s lane bandwidths). In some embodiments, each optical lane may correspond with a different lane bandwidth amount (e.g., some optical lanes having 100 Gb/s while other optical lanes having 10 Gb/s). In some embodiments, optical lanes that experience and/or are associated with an optical interruption event may not have their lane bandwidth aggregated into the total MLOP bandwidth, thereby possibly decreasing the MLOP bandwidth if another optical lane is not brought online (i.e., activated and put into use) so as to recover the missing lane bandwidth. It is understood that the examples provided are for illustration purposes only, and therefore should not be construed as limiting the scope of the concepts and technologies in any way.

In some embodiments, an MLOP may include a plurality of optical lanes, with at least one "reserve optical lane" which is an optical lane that is held in reserve and not in use until activated via data transmission by one of the multi-lane optical transceivers. As such, if one optical lane experiences or is otherwise associated with an optical interruption event—which will be explained in further detail below— then a reserve optical lane may be activated so as to restore the MLOP bandwidth to full capacity. For example, in an embodiment, if the MLOP 1 included four optical lanes 182A-182D and one reserve optical lane (e.g., the optical lane 182N), then the reserve optical lane could be put into use if one of the four optical lanes 182A-182D experienced or otherwise is associated with an optical interruption event. As discussed in further detail below, each optical lane (e.g., any of the optical lanes 182A-182N) can provide transport for an entire data package or a portion or segment of a data package. For example, in an embodiment, some and/or all of the data package 106 may be disassembled into a plurality of data package segments 106A-106D, where one or more of the data package segments 106A-106D can be sent along the optical lanes 182A-182D, respectively. It is understood that the examples provided are for illustration purposed only, and therefore should not be construed as limiting in any way. It is understood that, in the claims, the phrases "optical lane (s)," "multi-lane optical path(s)," and variations thereof do not include (and should not be construed to include) waves or signals per se and/or communication media.

In various embodiments, each of the network element 114 and the network element 150 (and components included therein) may be considered a "peer" with each other due to a direct and/or indirect communicative coupling within the network 110 via one or more multi-lane optical paths. For clarity, the use of the terms "first," "second," "third," "fourth," or any other numeral may be used for discussion purposes so as to distinguish between various components. It is understood that use of these terms such as "first," "second," "third," "fourth," or other numerals discussed herein, should not be interpreted or construed to infer, imply, or convey a priority, a hierarchy, a preference, a limitation, a collective amount, a status, an order, and/or any of characteristic within or beyond the component being described. It is understood that reference to a numeral in the context of describing an item of the present disclosure is for illustration purposes only, and therefore should not be construed as limiting in any way. For illustration purposes only, the network element 114 will be referred to as the "first network element 114" and the network element 150 can be referred to as the "second network element 150."

In some embodiments, a network element (e.g., the first network element 114 and the second network element 150) can include a power supply, a network interface, and one or more multi-lane optical transceiver ("MLOT"). For example, the first network element 114 can include a network interface 116, a power supply 120, an MLOT 118, and an MLOT 146. In some embodiments, the first network element 114 may have one MLOT, two MLOTs, or more than two MLOTs. For clarity purposes, the MLOT 118 can be referred to as a "first MLOT 118" and the MLOT 146 can be referred to as a "second MLOT 146." The examples and use of terms "first" and "second" are provided for illustration purposes only, and therefore should not be construed as limiting in any way. Also, the second network element 150 can include a power supply 160, a network interface 152, an MLOT 154, and an MLOT 156. In some embodiments, the second network element 150 may have one MLOT, two MLOTs, or more than two MLOTs. For clarity purposes, the MLOT 156 can be referred to as the "third MLOT 156" and the MLOT 146 can be referred to as the "fourth MLOT 154." The examples and use of terms "third" and "fourth" are provided for illustration purposed only so as to distinguish between the MLOTs illustrated in FIG. 1, and therefore should not be construed as limiting in any way.

In various embodiments, the power supply of a network element (e.g., the power supply 120 of the first network element 114 and/or the power supply 160 of the second network element 150) can provide a constant and/or variable power (e.g., measured in milliamps and/or volts) to any component within the network element (e.g., any MLOT within the first network element 114 and/or the second network element 150). It is understood that a power supply (e.g., the power supply 120 and/or the power supply 160) can provide different amounts of power, voltage, and/or amperage to components within the network element, such as to alter optical transmission to another network element by changing an amount of power sent to an optical transmitter of an MLOT. In some embodiments, each MLOT may have a power supply in addition to and/or in lieu of the power supply of the network element (e.g., the power supply 120 of the first network element 114 and/or the power supply 160 of the second network element 150). For example, in an embodiment, each MLOT may draw power from a power supply (e.g., the power supply 120 or 160), and in turn provide a voltage to components within the MLOT, which are described in detail below.

A network interface (e.g., the network interface 116 and the network interface 152), can transfer data to and from a network element. In some embodiments, a network interface (e.g., the network interfaces 116, 152) can provide an electrical pin interface, an electrical coupler interface, an optical coupling interface, or the like. For example, the network interface 116 can communicatively couple the first network element 114 to other devices within the network 110, such as but not limited to, the network access point 112 and the network management system 188. Also, the network interface 152 can communicatively couple the second network element 150 to other devices within the network 110, such as but not limited to, the optical network terminal 192 and the network management system 188. The network interface 116 directs data to and/or from to any MLOT within the first network element 114, such as the first MLOT 118 and/or the second MLOT 146. Similarly, the network interface 152 can direct data to and/or from any MLOT within the second network element 150, such as the third MLOT 156 and/or the fourth MLOT 154. In various embodiments, the first MLOT 118 is communicatively coupled to the third MLOT 156 via the MLOP 1, and the second MLOT 146 is communicatively coupled to the fourth MLOT 154 via the MLOP 2. In some embodiments, the first MLOT 118 may be referred to as a "peer" of the third MLOT 156 (and vice-versa) based on the communicative coupling that is provided via the MLOP 1. Similarly, in some embodiments, the second MLOT 146 may be referred to as a "peer" of the fourth MLOT 154 (and vice versa) based on the communicative coupling that is provided via the MLOP 2.

In various embodiments, an MLOT (e.g., any of the MLOTS 118, 146, 154, 156) can be configured as a full duplex, photonic-integrated optical transceiver that provides a high-speed link (e.g., via one or more MLOP 1 and/or 2) with an aggregated data rate (e.g., less than 40 Gb/s, 40 Gb/s, 100 GB/s, 400 Gb/s, 1 Tb/s, any data rate in between the data rates listed, or more than 1 Tb/s) that can operate with full and/or partial transmit functionality and full and/or partial receive functionality in one or more hosts devices (e.g., the network elements 114, 150). In various embodiments, an MLOT can be configured to comply with one or more industry standards, such as but not limited to, an Institute of Electrical and Electronics Engineers ("IEEE") standard (e.g., an 802.3 standard), an International Telecommunication Union Telecommunication standardization Sector ("ITU-T") standard (e.g., G.959.1), and/or other industry standards known to one of ordinary skill in the technology.

In various embodiments, an MLOT (e.g., any of the first MLOT 118, the second MLOT 146, the third MLOT 156, and the fourth MLOT 154) can include a controller, a transmission optical sub-assembly ("TOSA"), and a receiver optical sub-assembly ("ROSA"). For example, the first MLOT 118 can include a controller 122, a TOSA 128, and a ROSA 138. Similarly, a third MLOT 156 can include a controller 158, a TOSA 162, and a ROSA 170. The second MLOT 146 can be configured substantially similar to that of the first MLOT 118. The fourth MLOT 154 can be configured substantially similar to that of the third MLOT 156. As such, it is understood that instances of any and/or all of the components within the first MLOT 118 and/or the second MLOT 146 that are shown and described with respect to FIG. 1 can be included within the third MLOT 156 and/or the fourth MLOT 154. It is understood that the examples described are for illustration purposes only, and should not be construed as limiting in any way.

A controller (e.g., the controller 122 of the first MLOT 118 and the controller 158 of the third MLOT 156) can include a processor and a memory that stores instructions to enable performance of one or more operations described herein. In various embodiments, the processor of the controllers 122, 158 can include one or more of a central processing unit, a graphics processing unit, a system-on-chip circuit, a combination thereof, and/or other compute resources that can be configured upon execution to perform operations discussed herein. A memory of the controllers 122, 158 can provide temporary and/or permanent storage operations, and can include volatile and/or non-volatile memory that can be implemented in any method of technology for storage of information, such as computer readable instructions, data structures, program modules, or other data disclosed herein. Each MLOT can include one or more TOSA and one or more ROSA that can provide a transmit path and a receive path. The controllers 122, 158 can provide functionality to make decisions as to how data should be handled by each TOSA and ROSA so as to determine whether a transmit path and/or a receive path should be used to convey or route data to and/or from the network elements 114, 150. For example, the first network element 114 may, upon receiving the data package 106 from the network access point 112, direct the data package 106 to the first MLOT 118 for transmission to the second network element 150. The controller 122 can pass the data package 106 to a component within the TOSA 128.

In some embodiments, a TOSA (e.g., the TOSA 128 and/or the TOSA 162) can include an optical distributor, a plurality of optical transmitters, and a multiplexer. For example, the TOSA 128 can include an optical distributor 134 that can be communicatively coupled to a plurality of optical transmitters 130A-130N. Each of the optical transmitters 130A-130N can be communicatively coupled with a multiplexer 132. Similarly, the TOSA 162 can include an optical distributor 166 that is communicatively coupled to a plurality of optical transmitters 164A-164N, and each of the optical transmitters 164A-164N can be communicatively coupled to a multiplexer 168. In some embodiments, an optical distributor (e.g., the optical distributors 134, 166) can include a continuous time linear equalizer that can collect and synchronize data that is conveyed electrically from a controller (e.g., the controllers 122, 158). In some embodiments, the optical distributors 134, 166 can segment a data package into a plurality of data package segments (e.g., the data package 106 being segmented into the plurality of data package segments 106A-106D). In some embodiments, the optical distributors 134, 166 can act upon the instruction of the controller to which they are associated, such as the controllers 122, 158. The controller (e.g., one of the controllers 122, 158) can indicate which optical transmitter(s) (e.g., any of the plurality of optical transmitters 130A-130N and/or the plurality of optical transmitters 164A-164N) is active and/or should be active and used to optically transmit data to a peer network element. The controllers 122, 158 also can indicate which specific wavelength should correspond with each of the optical transmitters that optically transmit data along corresponding optical lanes. In some embodiments, the controllers 122, 158 can indicate how many data segments should be created out of a received data package (e.g., the data package 106 and/or the subsequent data package 108), and which data segments should be distributed to one or more optical transmitters. In some embodiments, the controllers 122, 158 can uniformly and/or non-uniformly distribute data segments of a data package to one or more optical transmitters for transmission along an MLOP, such as any of the MLOP 1 and/or the MLOP 2. In some embodiments, the controllers 122, 158 can be instructed (e.g., by an optical protocol message) to non-uniformly distribute data segments by utilizing less than all of the optical lanes within an MLOP, thereby throttling the bandwidth while maintaining communicative coupling via an MLOP despite the occurrence of one or more optical interruption events, which will be described in further detail below. The optical distributors 134, 166 can receive an indication from the controllers 122, 158 as to which optical transmitters should be used, and can convey one or more data package segments (e.g., any of the data package segments 106A-106D) to one or more optical transmitter (e.g., any of the plurality of optical transmitters 130A-130N and/or the plurality of optical transmitters 164A-164N). In some embodiments, the optical distributors 134, 166 can include a clock-data recovery chip or circuitry that syncs and times the relay of data package segments.

An optical transmitter (e.g., any of the plurality of optical transmitters 130A-130N and/or the plurality of optical transmitters 164A-164N) can include an optical device driver, such as but not limited to, one or more of a laser device driver and/or a light emitting diode device driver. Each optical transmitter can generate and provide an optical signal corresponding to a specific wavelength via one or more optical device drivers that drives a laser and/or light emitting diode at a specific wavelength. Because each optical transmitter can correspond with an optical lane of an MLOP, each optical lane is associated with the specific wavelength that is provided by the optical transmitter that transmits data along the optical lane. In some embodiments, the controllers 122, 158 can instruct one or more of the optical transmitters (e.g., any of the plurality of optical transmitters 130A-130N and/or the plurality of optical transmitters 164A-164N) to change and/or alter the specific wavelength that is being used to convey data. For example, in an embodiment, the optical transmitters 130A-130D may each generate an optical signal at a different wavelength. In some embodiments, the optical transmitter 130N may be a reserve optical transmitter that is not active and used unless called upon by the controller 122. In an embodiment where the optical transmitter 130A no longer functions properly (e.g., being associated with an optical interruption event), then the controller 122 can activate the reserve optical transmitter (e.g., the optical transmitter 130N in this example) by providing a voltage to the reserve optical transmitter and instructing the reserve optical transmitter to assume the specific wavelength that formerly was attributed to the optical transmitter 130A that is currently not functioning properly. It is understood that the examples provided are for illustration purposes only, and therefore should not be construed as limiting in any way.

In various embodiments, data can be transmitted using optical signals that are generated by one or more optical transmitters (e.g., any of the plurality of optical transmitters 130A-130N and/or the plurality optical transmitters 164A-164N) and multiplexed together optically by a multiplexor (e.g., the multiplexer 132 and/or the multiplexer 168) into a single and/or multiple MLOP (e.g., the MLOP 1 and/or the MLOP 2) through a connector (e.g., an industry standard optical connector). In the embodiment illustrated in FIG. 1, the portion 1A of the MLOP 1 can facilitate optical transmission from the TOSA 128 of the first MLOT 118 within the first network element 114 to the ROSA 170 of the third MLOT 156 within the second network element 150. The portion 1B of the MLOP 1 can facilitate optical transmission from the TOSA 162 of the third MLOT 156 within the second network element 150 to the ROSA 138 of the first MLOT 118 within the first network element 114. Similarly, the MLOP 2 can facilitate optical transmission between the second MLOT 146 and the fourth MLOT 154.

In some embodiments, a ROSA (e.g., the ROSA 138 of the first MLOT 118 and the ROSA 170 of the third MLOT 156) can be configured to receive optical transmissions via an MLOP (e.g., the MLOP 1 and/or the MLOP 2). A ROSA can include a demultiplexer (e.g., a demultiplexer 176 of the ROSA 170 and a demultiplexer 144 of the ROSA 138), a plurality of optical receivers (e.g., a plurality of optical receivers 172A-172N of the ROSA 170 and a plurality of optical receivers 140A-140N of the ROSA 138), and a receiving amplifier (e.g., a receiver amplifier 174 of the ROSA 170 and the receiver amplifier 142 of the ROSA 138). The demultiplexers can receive the multiplexed optical transmissions from the MLOP (e.g., demultiplexer 176 receiving optical transmissions via the portion 1A and the demultiplexer 144 receiving optical transmission via the portion 1B) and can optically separate the incoming transmissions into separate wavelengths corresponding to each of the optical lanes within the MLOP. The optical transmissions from each optical lane can be passed along to the optical receivers (e.g., the plurality of optical receivers 172A-174 and the plurality of optical receivers 140A-140N). The optical receivers can include a photodetector and/or a photonic diode that can convert the received optical transmissions from each optical lane into electrical transmissions that are routed to the receiver amplifier (e.g., the receiver amplifiers 174, 142). The receiver amplifiers 174, 142 can include a transimpedance amplifier, a limiting amplifier, and/or a clock and data recovery chip that can recover the output from the optical receivers, sync, retime, and reshape the data transmissions corresponding to each optical lane so that the data package segments can be sent to the controller on the MLOT for analysis and operations.

In some embodiments, a controller (e.g., the controllers 122, 158) can reassemble the data package segments (e.g., the data package segments 106A-106D) back into the data package 106 and use the network interface (e.g., the network interfaces 116, 152) to relay the data package 106 onto a next hop of the network 110 (e.g., the optical network terminal 192). In various embodiments, the controller 122 can route the data package 106 to the first MLOT 118, which in turn can segment the data package 106 into the data package segments 106A-106D that are sent via the optical lanes 182A-182D which are multiplexed together in the MLOP 1. The third MLOT 156 of the second network element 150 can recover and separate the data transmission corresponding to each of the optical lanes 182A-182D via the ROSA 170. The controller 158 can analyze the received transmissions to determine whether an optical interruption event has occurred. An optical interruption event (e.g., the optical interruption event 180) is a detected anomaly, irregularity, and/or failure of optical transmission at a specific wavelength along an optical lane of an MLOP so as to cause one or more of data loss, connectivity loss, failure to send and/or receive an optical transmission along the optical lane, and/or the inability of a controller to reassemble a data package from the data segments that are received over one or more optical lanes of an MLOP. In some embodiments, an optical interruption event may occur corresponding to one or more lanes of the MLOP that was used. This can cause conventional systems to consider the entire MLOP in use to be "lost" (i.e., cease use of all optical lanes irrespective of their functionality) and the conventional systems would no longer allow communicative connectivity along any optical lane of the MLOP until the optical interruption event is remedied. However, embodiments of the present disclosure can recover from optical interruption events by maintaining connectivity of the MLOP despite occurrence of an optical interruption event.

For example, in various embodiments, the controller 158 may detect that the optical lanes 182A-182D are supposed to be in use and therefore determine whether a wavelength corresponding to one of the optical lanes is detected. In an embodiment, an optical interruption event, such as the optical interruption event 180, may occur and the controller 158 of the third MLOT 156 that is receiving data from the first MLOT 118 may detect that the optical interruption event 180 is associated with the optical lane 182A of the MLOP 1. The controller 158 also may detect and determine that the optical interruption event 180 is associated only with the optical lane 182A of the MLOP 1, and thus a plurality of optical lanes of the MLOP 1 do not correspond with the optical interruption event 180, such as the optical lanes 182B-182N shown in the portion 1A of the MLOP 1. Each of the optical lanes 182B-182N can have different wavelengths that remain functional and are not associated with the optical interruption event 180 which was associated with the optical lane 182A in this example. In some embodiments, the controllers 122, 158 can store a transmission configuration 124, 157 that can define which optical transmitters and/or optical receivers should be in use and the wavelength that should be provided by a peer optical transmitter corresponding with each optical lane of an MLOP. For example, each of the transmission configurations 124, 157 can indicate that the optical lanes 182A-182D should be in use within the MLOP 1 and that the optical transmitters 130A-130D should provide optical data transmissions associated with different specific wavelengths for each of the optical lanes 182A-182D. The transmission configurations 124, 157 can indicate which wavelength should correspond with each optical lane in use for an MLOP. The controller 158 can monitor incoming data transmissions and determine whether an optical interruption event (e.g., the optical interruption event 180) has occurred corresponding to the optical lane (e.g., one or more of the optical lanes 182A-182N) within the MLOP 1 that was supposed to be used to convey one or more of the data package segment 106A-106D.

In an embodiment, an example of the optical interruption event 180 can include the optical transmitter 130A failing to generate an optical transmission along the optical lane 182A and/or providing a distorted transmission that uses an incorrect wavelength (i.e., a wavelength that was not designated for use by the optical transmitter 130A according to the transmission configuration 124). The controller 158 can determine that a wavelength is not detected for the optical lane 182A from the MLOP 1, thereby indicating that an optical interruption event has occurred. In some embodiments, the occurrence of the optical interruption event 180 can cause a data package segment (e.g., the data package segment 106A) to be absent or corrupted, thereby preventing reassembly of the data package 106. It is understood that the examples provided are for illustration purposes only, and therefore should not be construed as limiting in any way.

In another embodiment, an example of the optical interruption event 180 can include the optical transmitter 130 and/or the optical lane 182A malfunctioning such that optical transmission is provided along the optical lane 182A on an intermittent basis, thereby causing data transmission to be interrupted for at least a time period, such as an interruption time period. The interruption time period 191 can define a period of time (e.g., measured in milliseconds and/or seconds) that elapses without an optical receiver receiving data transmission along an optical lane when the data transmission should have been received. In some embodiments, the optical receiver may receive an optical transmission before and/or after the interruption time period 191, however based on the optical receiver failing to receive data during the interruption time period 191, the controller 158 can determine that an optical interruption event 180 has occurred. In some embodiments, the optical interruption event 180 can occur due to a faulty laser driver of the optical transmitter of the peer MLOT (e.g., the optical transmitter 130 of the first MLOT 118), a defective portion of an MLOP (e.g., a portion of fiber optic strand that is associated with the optical lane 182A), a combination thereof, or any other event that may cause interruption to the transmission and/or reception of data between network elements. In some embodiments, the interruption time period 191 can be stored as a value in the memory an MLOT and/or the memory of the network management system 188. It is understood that the examples provided are for illustration purposes only, and therefore should not be construed as limiting in any way.

In some embodiments, the occurrence of the optical interruption event 180 can trigger the controller 158 to instantiate an optical protocol alarm, such as the optical protocol alarm 181. The optical protocol alarm 181 includes an alarm and/or alert that is generated based on detection of one or more optical interruption events corresponding with at least one optical lane. In some embodiments, the optical protocol alarm 181 can conform to an industry protocol, such as a simple network management protocol. The optical protocol alarm 181 can include a description of the optical interruption event 180 and identify information corresponding to the optical interruption event 180, such as an identifier of the MLOT that detected the optical interruption event 180 (e.g., identifier of the third MLOT 156), the optical lane and wavelength of the MLOP associated with the optical interruption event (e.g., identification of the optical lane 182A and corresponding wavelength), the sending peer MLOT and/or peer optical transmitter that corresponds with the optical interruption event (e.g., the first MLOT 118 and/or the optical transmitter 130A corresponding to the optical lane 182A that experienced the optical interruption event 180), a time and/or date that the optical interruption event 180 occurred, an amount of bandwidth provided by the optical lane that experienced the optical interruption event 180 (e.g., an indication that the optical lane 182A provided 100 Gb/s of bandwidth prior to occurrence of the optical interruption event 180), an indication of whether an optical protocol message was generated in response to the optical interruption event 180, a combination thereof, or the like. In an embodiment, the third MLOT 156 can provide the optical protocol alarm 181 to a network ticket application 189 executing on the network management system 188. In some embodiments, the network management system 188 can generate a network ticket that informs other systems and/or administrators that the sending MLOT (e.g., the first MLOT 118) may be in need of maintenance.

In various embodiments, the controller 158 can generate an optical protocol message 184 based on the optical protocol alarm 181. The optical protocol message 184 can be provided to a peer MLOT so as to instruct the peer MLOT to alter optical transmission of data along one or more MLOP. For example, in an embodiment, the optical protocol message 184 can be sent from the TOSA 162 of the third MLOT 156 of the second network element 150 to the ROSA 138 of the first MLOT 118 (which in this example would be considered to be the peer MLOT of the third MLOT 156) via the portion 1B of the MLOP 1. The ROSA 138 can pass the optical protocol message 184 to the controller 122 that, once received, can alter handling and/or optical transmission along the MLOP 1 which experienced the optical interruption event 180.

In an embodiment, the optical protocol message 184 can include an optical transmission command 185 that alters the transmission configuration 124 implemented by the first MLOT 118 (which in this example can be considered the peer MLOT to the third MLOT 156). For example, the transmission configuration 124 may initially indicate (prior to the data package 106 being sent and the optical interruption event 180 being detected) that the optical transmitters 130A-130D should be used and that the optical transmitter 130N should be a reserve optical transmitter that is held in a non-active state (i.e., not providing power to the optical transmitter while not in use). In some embodiments, the optical transmission command 185 can instruct the first MLOT 118 to route power to the reserve optical transmitter (in this example the optical transmitter 130N) so as to provide optical transmission at a specific wavelength. In some embodiments, the optical transmission command 185 can identify the specific wavelength that was associated with the optical lane that experienced and/or was associated with the optical interruption event 180 (e.g., the optical lane 182A), where the specific wavelength was supposed to be detected by the third MLOT 156. The optical protocol message 184 can instruct the controller 122 to configure the reserve optical transmitter (e.g., the optical transmitter 130N) to provide optical transmission along the optical lane 182N using the specific wavelength that previously was designated to the optical lane that was associated with the optical interruption event 180 (e.g., the optical lane 182A). By this, in some embodiments, the third MLOT 156 can instruct the first MLOT 118 to restore the amount of bandwidth that was provided by the MLOP 1 prior to the optical interruption event 180.

In some embodiments, the optical protocol message 184 can instruct the first MLOT 118 to alter optical transmission by routing data (e.g., the subsequent data package 108) through the plurality of optical lanes that do not correspond with the optical interruption event 180, such as the optical lanes 182B-182D. In an embodiment, if the optical protocol message 184 commands the first MLOT 118 to activate a reserve optical transmitter (e.g., the optical transmitter 130N), then the first MLOT 118 can also utilize the optical lane 182N to provide optical transmission that conveys at least a portion of data (e.g., one or more segments of the subsequent data package 108) to the third MLOT 156. In some embodiments, the optical protocol message 184 can instruct the first MLOT 118 to alter optical transmission by routing data through one or more of the plurality of optical lanes 182B-182N that do not correspond with the optical interruption event 180 while also instructing the controller 122 to maintain power that is sent to the optical transmitter 130A that is associated with the optical lane 182A that corresponds with the optical interruption event 180. By maintaining power to the optical transmitter 130A that is associated with the optical interruption event 180, yet not routing data through the optical lane 182A that is used by the optical transmitter 130A, the first MLOT 118 can monitor whether the optical transmitter 130A is producing an optical signal that allows for optical transmission and allows the third MLOT 156 to determine whether the optical interruption event 180 is occurring due to the optical transmitter 130A or whether the optical interruption event 180 corresponds with the optical lane of the MLOP 1 (e.g., due to a faulty portion of the MLOP 1).

In some embodiments, the optical protocol message 184 can instruct the first MLOT 118 to alter optical transmission by throttling bandwidth of the MLOP 1 to below a bandwidth minimum threshold 190. The bandwidth minimum threshold 190 can correspond with an amount of bandwidth originally defined by an original equipment manufacturer, a network policy definition, or other specification, and assigned to the MLOP 1 based on the minimum number of optical lanes that are in use and collectively provide the bandwidth when an optical interruption event has not occurred. For example, in some embodiments, the bandwidth minimum threshold 190 can be a maximum amount of bandwidth that can be attained when all optical transmitters are in use to provide data transmission along an MLOP (e.g., the MLOP 1). Stated differently, in some embodiments, the bandwidth minimum threshold 190 may correspond with a full one hundred percent bandwidth capability of the MLOP when no optical interruption events are detected. In conventional system, when an optical interruption event occurs, less than all of the optical lanes are capable of being utilized, and thus conventional systems discontinue use of the entire MLOP (i.e., conventional systems stop the use of all optical lanes) because the current bandwidth has fallen below the bandwidth minimum threshold 190 for that MLOP. However, embodiments of the present disclosure enable the third MLOT 156 to instruct the first MLOT 118 to throttle bandwidth of the MLOP 1 to below the bandwidth minimum threshold 190 while maintaining connection along the MLOP. In some embodiments, the bandwidth minimum threshold 190 can be stored as a value within the network management system 188. It is understood that the examples provided are for illustration purposes only, and therefore should not be construed as limiting in any way.

In some embodiments, the optical protocol message 184 can instruct the first MLOT 118 to alter distribution of data package segments (e.g., from the subsequent data package 108) such that data package segments that would have been sent to optical transmitter 130A are instead sent to any one of the other optical transmitters that have optical lanes which are not associated with the optical interruption event (e.g., any of the optical transmitters 130B-130N corresponding with optical lanes 182B-182N). In some embodiments, the optical protocol message 184 can alter optical transmission by instructing the controller 122 to cease providing power to the optical transmitter 130A, thereby shutting down the optical lane 182A until the optical interruption event 180 is remedied. It is understood that the examples provided are for illustration purposes only, and therefore should not be construed as limiting in any way.

In some embodiments, data packages can include a network latency indicator, such as the data package 106 including a network latency indicator 107 and the subsequent data package 108 including the network latency indicator 109. The network latency indicators 107, 109 can indicate an amount of time attributed to network latency (e.g., measured in milliseconds or seconds) that the data package 106 is allowed to incur while being routed between hops (e.g., between the first network element 114 and the second network element 150). In some embodiments, a controller of an MLOT can store a latency mapping, such as the first MLOT 118 storing a latency mapping 126 and the third MLOT 156 storing a latency mapping 159. The latency mappings 126, 159 can indicate an amount of latency (e.g., measured in milliseconds or seconds) that would be incurred if the MLOP 1 is used to transmit and/or receive data between the first MLOT 118 and the third MLOT 156. The latency mappings 126, 159 can vary based on the amount of bandwidth that the MLOP 1 is capable of providing given the number of optical lanes that are in use and/or capable of being put in active use.

For example, when the controller 122 receives the data package 106 prior to detection of the optical interruption event 180 by the third MLOT 156, the controller 122 can compare the network latency indicator 107 of the data package 106 with the latency mapping 126. If the latency time indicated by the latency mapping 126 is less than the time indicated by the network latency indicator 107, then the controller 122 can route the entire data package 106 to the TOSA 128 for optical transmission along the MLOP 1. However, in an embodiment where the third MLOT 156 detects that the optical interruption event 180 has occurred, the controller 158 can configure the optical protocol message 184 to update the latency mappings 126, 159 such that when the subsequent data package 108 arrives to the first network element 114, the controller 122 can identify whether the current latency of the MLOP 1 conforms to the requirements of the subsequent data package 108. The latency mappings 126, 159 can include updated times that correspond with a decreased, altered, or otherwise throttled amount of bandwidth that is available due to the MLOP 1 having a decreased amount of optical lanes available for transmission. For example, the controller 122 can analyze and compare the network latency indicator 109 of the subsequent data package 108 and determine whether an updated time within the latency mapping 126 is less than the network latency indicator 109. If the updated time within the latency mapping 126 is less than the network latency indicator 109, then the controller 122 can provide the subsequent data package 108 to the TOSA 128 for transmission to the third MLOT 156 along the MLOP 1 that is current utilizing the optical lanes 182B-182N (or any number thereof) that are not associated with the optical interruption event 180.

Figure 2A:
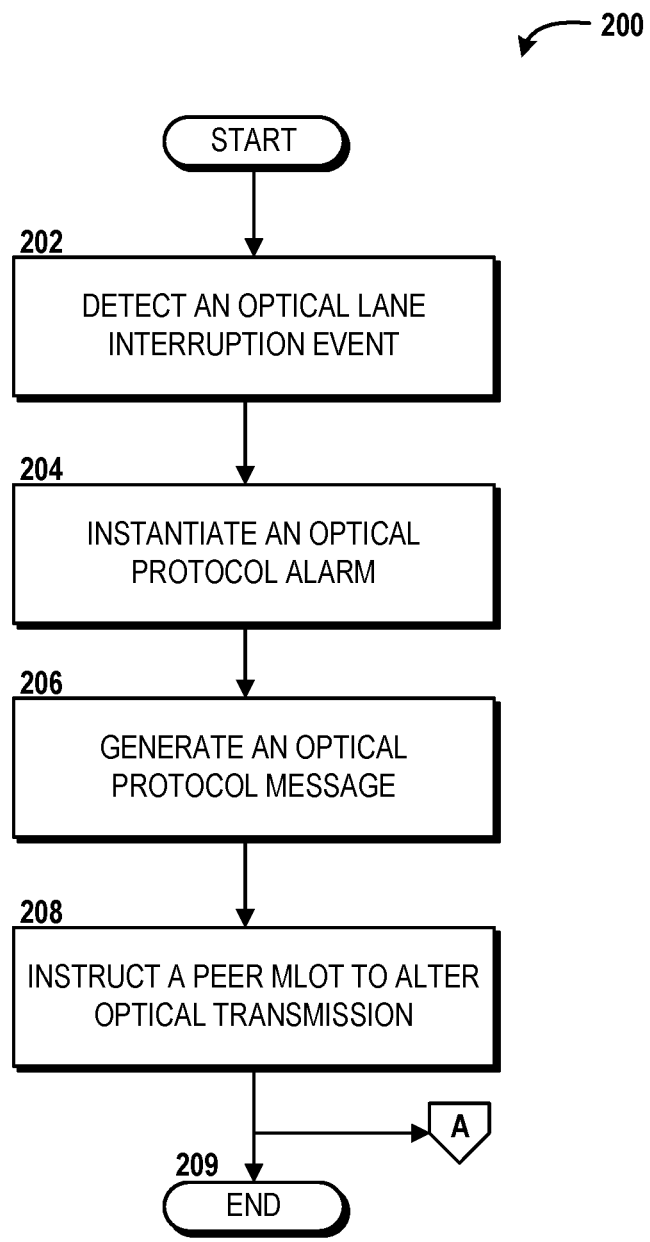
FIG. 2A is a flow diagram showing aspects of a method for multi-lane optical transport network recovery, according to an illustrative embodiment of the concepts and technologies described herein.

In an embodiment, the controller 122 can analyze and compare the network latency indicator 109 of the subsequent data package 108 and determine that the updated time within the latency mapping 126 is not less than the network latency indicator 109. When the updated time within the latency mapping 126 is not less than the network latency indicator 109, the controller 122 can route some and/or all data segments of the subsequent data package 108 to another MLOT that can satisfy the latency requirements due to the other MLOT using an MLOP with higher bandwidth than the MLOP 1. For example, the first network element 114 can be configured to include an internal bypass route 136 that communicatively couples the first MLOT 118 to the second MLOT 146. The second MLOT 146 can have a controller with a latency mapping (not shown) which indicates that the MLOP 2 has a latency that is less than the network latency indicator 109, and thus is capable of delivering some and/or all of the subsequent data package 108 to the second network element 150. In an embodiment, the controller 122 can create a bypass message 186 that can include only a portion (e.g., less than all of the data segments) of the subsequent data package 108 for routing to the second network element 150 via the internal bypass route 136 and the MLOP 2, while the remaining portion (i.e., the remaining data segments) of the subsequent data package 108 is routed to the second network element 150 via the MLOP 1. When a bypass message 186 is implemented, the fourth MLOT 154 can relay the bypass message 186 to the third MLOT 156 via an internal bypass route 137 of the second network element 150. The controller 158 of the third MLOT 156 can reassemble the subsequent data package 108 by combining the portion of data segments of the subsequent data package 108 sent in the bypass message 186 via the MLOP 2 with the remaining portion of data segments of the subsequent data package 108 sent via the MLOP 1. The third MLOT 156 can reassemble a data package using segments received from one or more of the MLOPs, such as the MLOP 1 and/or the MLOP 2, which may be referred to as a reassembled data package 111, however this may not be the case in all embodiments. It is understood that the examples are for illustration purposes only and should not be construed as limiting in any way It is also understood that zero, one, or more than one instance of the user 102, the user equipment 103, the data package 106, the subsequent data package 108, the reassembled data package 111, the network 110, the network access point 112, the first network element 114, the network interface 116, the first MLOT 118, the power supply 120, the controller 122, the transmission configuration 124, the latency mapping 126, the TOSA 128, the plurality of optical transmitters 130A-130N, the multiplexer 132, the optical distributor 134, the internal bypass route 136, the ROSA 138, the plurality of optical receivers 140A-140N, the receiver amplifier 142, the demultiplexer 144, the second MLOT 146, the MLOP 1, the MLOP 2, the second network element 150, the network interface 152, the fourth MLOT 154, the third MLOT 156, the controller 158, the transmission configuration 157, the latency mapping 159, the power supply 160, the TOSA 162, the plurality of optical transmitters 164A-164N, the optical distributor 166, the multiplexer 168, the ROSA 170, the plurality of optical receivers 172A, the internal bypass route 137, the receiver amplifier 174, the demultiplexer 176, the optical interruption event 180, the optical protocol alarm 181, the plurality of optical lanes 182A-182N, the optical protocol message 184, the optical transmission command 185, the bypass message 186, the network management system 188, the network ticket application 189, the bandwidth minimum threshold 190, the interruption time period 191, the optical network terminal 192, the network access point 193, the user equipment 194, the user 195, and instances of elements included therein, can be included within the operating environment 100. It is understood that reference to the letter "N" denotes one or more than one instances of a corresponding element of the present disclosure. It is understood that the examples are for illustration purposes only and should not be construed as limiting in any way Turning now to FIG. 2, aspects of a method 200 and a method 210 for multi-lane optical transport network recovery are provided herein, according to an illustrative embodiment. It should be understood that the operations of the method disclosed herein (e.g., the method 200 and the method 210) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, network elements, multi-lane optical transceivers, routers, switches, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the controller 122 of the first MLOT 118 and/or the controller 158 of the third MLOT 156, to perform one or more operations and/or causing the processor to direct other components of the computing system or device to perform one or more of the operations.

For purposes of illustrating and describing the concepts of the present disclosure, the methods disclosed herein are described as being performed by the third MLOT 156 and/or the first MLOT 118 via execution of one or more software modules and/or executable instructions that configure, for example, one or more processors of the controllers 158, 122. It should be understood that additional and/or alternative devices and/or network nodes can, in some embodiments, provide the functionality described herein via execution of one or more modules, applications, and/or other software including, but not limited to, the second MLOT 146, the fourth MLOT 154, the first network element 114, the second network element 150, the network management system 188, or the like. Thus, the illustrated embodiments are illustrative, and should not be viewed as being limiting in any way.

The method 200 begins at operation 202. At operation 202, the third MLOT 156 can detect an optical interruption event 180 that corresponds to the optical lane 182A within the MLOP 1. In some embodiments, the optical interruption event 180 is detected by determining that a data transmission via the optical lane 182A is interrupted for at least a time period, such as the interruption time period 191. In some embodiments, the third MLOT 156 can determine that the optical interruption event 180 precludes the third MLOT 156 from reassembling the data package 106 that was segmented and optically transmitted via a plurality of optical lanes (e.g., the optical lanes 182A-182N) of the MLOP 1. In some embodiments, the third MLOT 156 can detect the optical interruption event 180 by determining that a wavelength corresponding to the optical lane 182A is not detected from the incoming transmission of the MLOP 1. In some embodiments, the MLOP 1 includes the optical lane 182A that corresponds to the optical interruption event 180 and a plurality of optical lanes (e.g., the optical lanes 182B-182N) that do not correspond with the optical interruption event 180.

From operation 202, the method can proceed to operation 204, where the controller 158 of the third MLOT 156 can instantiate the optical protocol alarm 181 based on the optical interruption event 180 being detected. From operation 204, the method can proceed to operation 206, where the controller 158 of the third MLOT 156 can generate the optical protocol message 184 based on the optical protocol alarm 181. In some embodiments, the optical protocol message 184 can include the optical transmission command 185 that can alter the transmission configuration 157 implemented by the peer multi-lane optical transceiver, such as the first MLOT 118. In some embodiments, the optical protocol message 184 can instruct the first MLOT 118 to update the latency mapping 126 based on the detection of the optical interruption event 180 that decreased the available bandwidth of the MLOP 1 by ceasing optical transmission over the optical lane 182A that corresponds with the optical interruption event 180.

From operation 206, the method can proceed to operation 208, where the controller 158 of the third MLOT 156 can instruct a peer multi-lane optical transceiver (e.g., the first MLOT 118) to alter optical transmission along the MLOP 1 based on the optical protocol message 184. In some embodiments, the third MLOT 156 configures the optical protocol message 184 to instruct the peer multi-lane optical transceiver (e.g., the first MLOT 118) to alter optical transmission by commanding the controller 122 of the first MLOT 118 to route data (e.g., the subsequent data package 108) through the plurality of optical lanes that do not correspond with the optical interruption event 180 (e.g., the optical lanes 182B-182N of the MLOP 1). In some embodiments, the third MLOT 156 can configure the optical protocol message 184 to instruct the peer multi-lane optical transceiver (e.g., the first MLOT 118) to alter optical transmission by commanding the controller 122 of the first MLOT 118 to throttle bandwidth of the MLOP 1 to below the bandwidth minimum threshold 190, such as by ceasing to provide power to the optical transmitter 130A corresponding to the optical lane 182A that is associated with the optical interruption event 180.

From operation 208, the method 200 can proceed to operation 209, where the method 200 can end. In an embodiment, the method 200 can proceed to the method 210, which is described in detail below. It should be understood that this example is illustrative and therefore should not be construed as being limiting in any way.

Figure 2B:
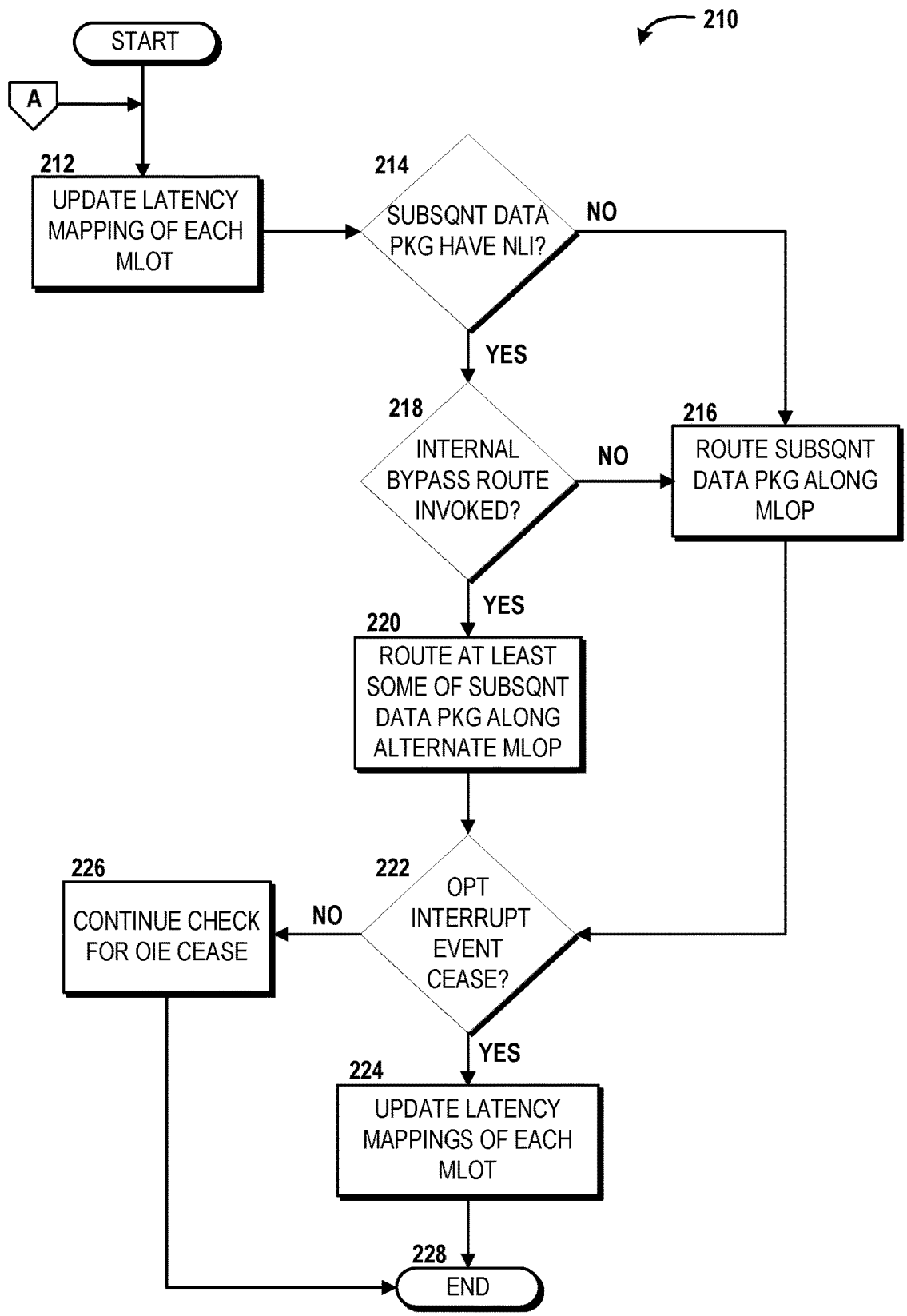
FIG. 2B is a flow diagram showing aspects of a method for multi-lane optical transport network recovery, according to another illustrative embodiment of the concepts and technologies described herein.

Turning now to FIG. 2B, a method 210 for multi-lane optical transport network recovery is disclosed. The method 210 can begin at operation 212, where each of the controllers 158, 122 can update the latency mappings 159, 126 within the third MLOT 156 and the first MLOT 118. The latency mappings 159, 126 can be updated based on the occurrence of the optical interruption event 180 that can cause the bandwidth of the MLOP 1 to decrease due to the optical lane 182A associated with the optical interruption event 180 being no longer iN use for data transmission. The latency mappings 159, 126 can be synced based on the amount of bandwidth that is available due to the faulty optical lane 182A. In some embodiments, the latency mapping 126 can be synced with the latency mapping 159 via the optical protocol message 184 that instructs the controller 122 to update the latency mapping 126.

From operation 212, the method can proceed to operation 214, where the controller 122 of the first MLOT 118 can determine whether a subsequent data package 108 has been received, and if so, whether the subsequent data package 108 has a network latency indicator 109. In an embodiment where the subsequent data package 108 does not have a network latency indicator 109, the method 210 can proceed along the NO path from operation 214 to operation 216, where the controller 122 can route the subsequent data package 108 to the MLOP 1 using the optical lanes that are not associated with the optical interruption event 180 (e.g., the optical lanes 182B-182N). In an embodiment where the subsequent data package 108 has a network latency indicator 109, the method 210 can proceed along the YES path from operation 214 to operation 218.

At operation 218, the controller 122 of the first MLOT 118 can determine whether the internal bypass route 136 should be invoked. For example, the controller 122 can analyze and compare the time indicated by the network latency indicator 109 of the subsequent data package 108 with the time associated with the MLOP 1 indicated in the latency mapping 126. If the time indicated for the MLOP 1 in the latency mapping 126 is less than the time indicated by the network latency indicator 109 of the subsequent data package 108, then the controller 122 determines that the internal bypass route 136 should not be invoked, and method 210 can proceed along the NO path to operation 216, where the subsequent data package 108 can be routed along the MLOP 1 using the optical lanes 182B-182N that do not correspond with the optical interruption event 180. In an embodiment where the time indicated for the MLOP 1 in the latency mapping 126 is equal to or greater than the time indicated by the network latency indicator 109 of the subsequent data package 108, then the controller 122 determines that the internal bypass route 136 should be invoked, and method 210 can proceed along the YES path to operation 220.

At operation 220, the controller 122 of the first MLOT 118 can invoke the internal bypass route 136 and route at least some and/or all of the subsequent data package 108 along the internal bypass route 136 to the second MLOT 146 and to the fourth MLOT 154 of the second network element 150 via the MLOP 2. The controller 158 of the third MLOT 156 can receive at least some and/or all of the subsequent data package 108 via the internal bypass route 137 of the second network element 150.

From operation 220, the method 210 can proceed to operation 222, where one or more of the controllers 122, 158 can determine whether the optical interruption event 180 has ceased. For example, at least one of the controllers 122, 158 can determine whether a wavelength corresponding to the optical lane 182A has been detected, and if so, can determine that the optical interruption event has ceased. If the wavelength corresponding to the optical lane 182A continues to not be detected, then the controllers 122, 158 can determine that the optical interruption event 180 remains active and has not ceased.

In an embodiment, if the optical interruption event 180 has not ceased, the method 210 can proceed from operation 222 along the NO path to operation 226, where at least one of the controllers 122, 158 can continue to check whether the optical interruption event 180 has ceased to occur. In an embodiment, the method 210 can proceed from operation 226 to operation 228, where the method 210 can end.

In an embodiment, if the optical interruption event 180 has ceased, the method 210 can proceed from operation 222 along the YES path to operation 224, where at least one of the controllers 122, 158 can update the latency mappings 126, 159 corresponding to each of the first MLOT 118 and the third MLOT 156, respectively. From operation 224, the method 210 can proceed to operation 228, where the method 210 can end.

Figure 3:
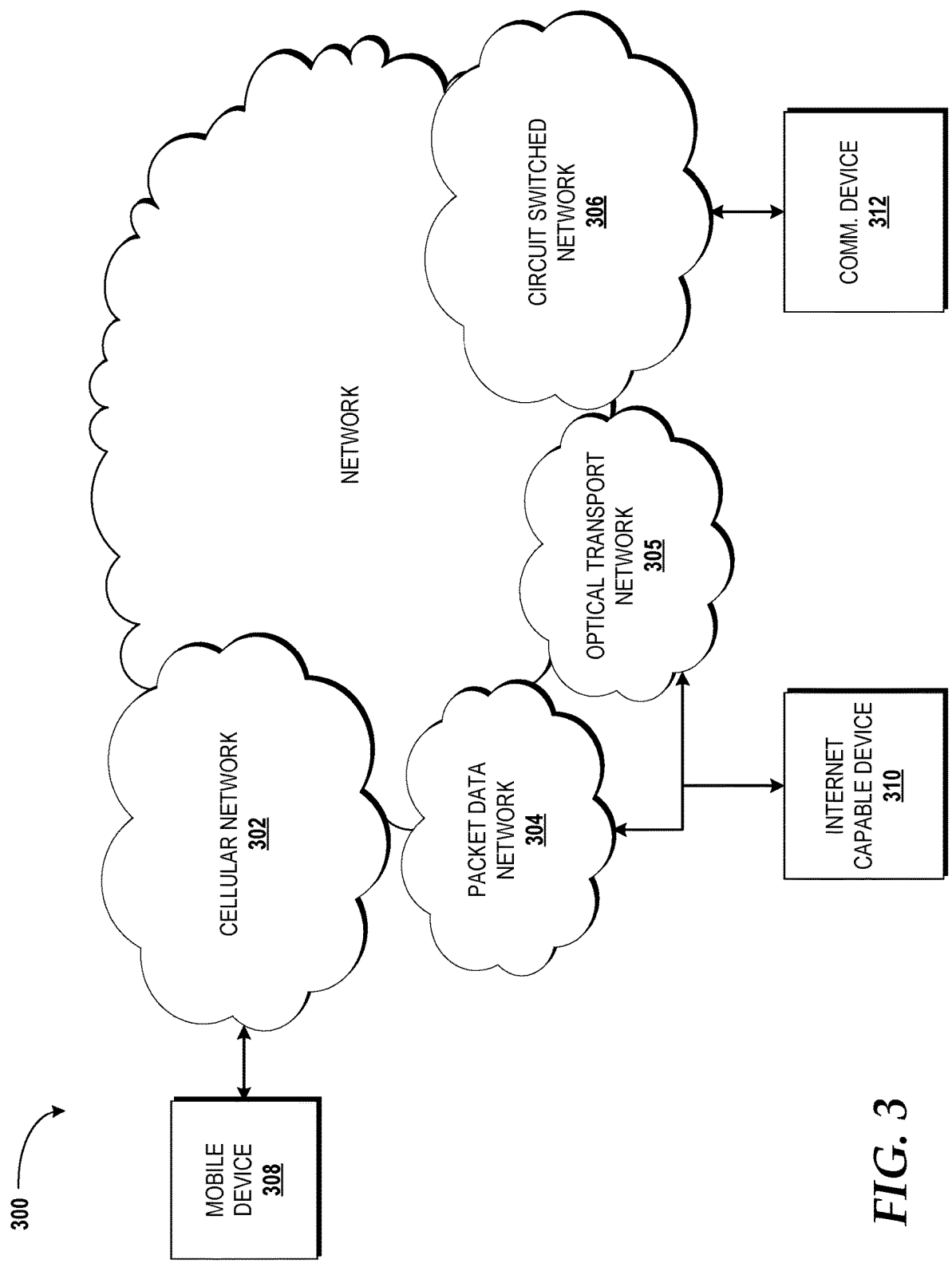
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 110 can be embodied as the network 300. The network 300 includes a cellular network 302, a packet data network 304, for example, the Internet, the optical transport network 305, and a circuit switched network 306, for example, a PSTN. The cellular network 302 includes various network components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment, a mobile terminal, a PDA, a laptop computer, a handheld computer, and combinations thereof, can be operatively connected to the cellular network 302. In some embodiments, the user equipment 104 and/or the user equipment 194 can be configured as the mobile communications device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-Advanced and LTE-U.

The packet data network 304 includes various devices, for example, servers, computers, databases, and other devices in communication with another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the network 110 can be configured to include a packet data network, such as the packet data network 304. The optical transport network 305 can include a set of network elements that are communicatively coupled by optical fiber paths and are able to provide functionality of transport, multiplexing, switching, management, supervision and survivability of optical channels, retiming, reshaping, reamplifying, and relaying. The network 110 can include the optical transport network 305. The circuit switched network 306 includes various hardware and software for providing circuit switched communications. The circuit switched network 306 may include, or may be, what is often referred to as a POTS. In some embodiments, the network 110 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a network element, a PC, a laptop, a portable device, a user equipment, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 305, 306 shown in FIG. 3. It should be appreciated that, in some embodiments, substantially all of the functionality described with reference to the network 110 can be performed by one or more of the optical transport network 305, the cellular network 302, the packet data network 304, and/or the circuit switched network 306, alone or in combination with other networks, network elements, and the like, according at least to aspects of the features and operations discussed herein.

Figure 4:
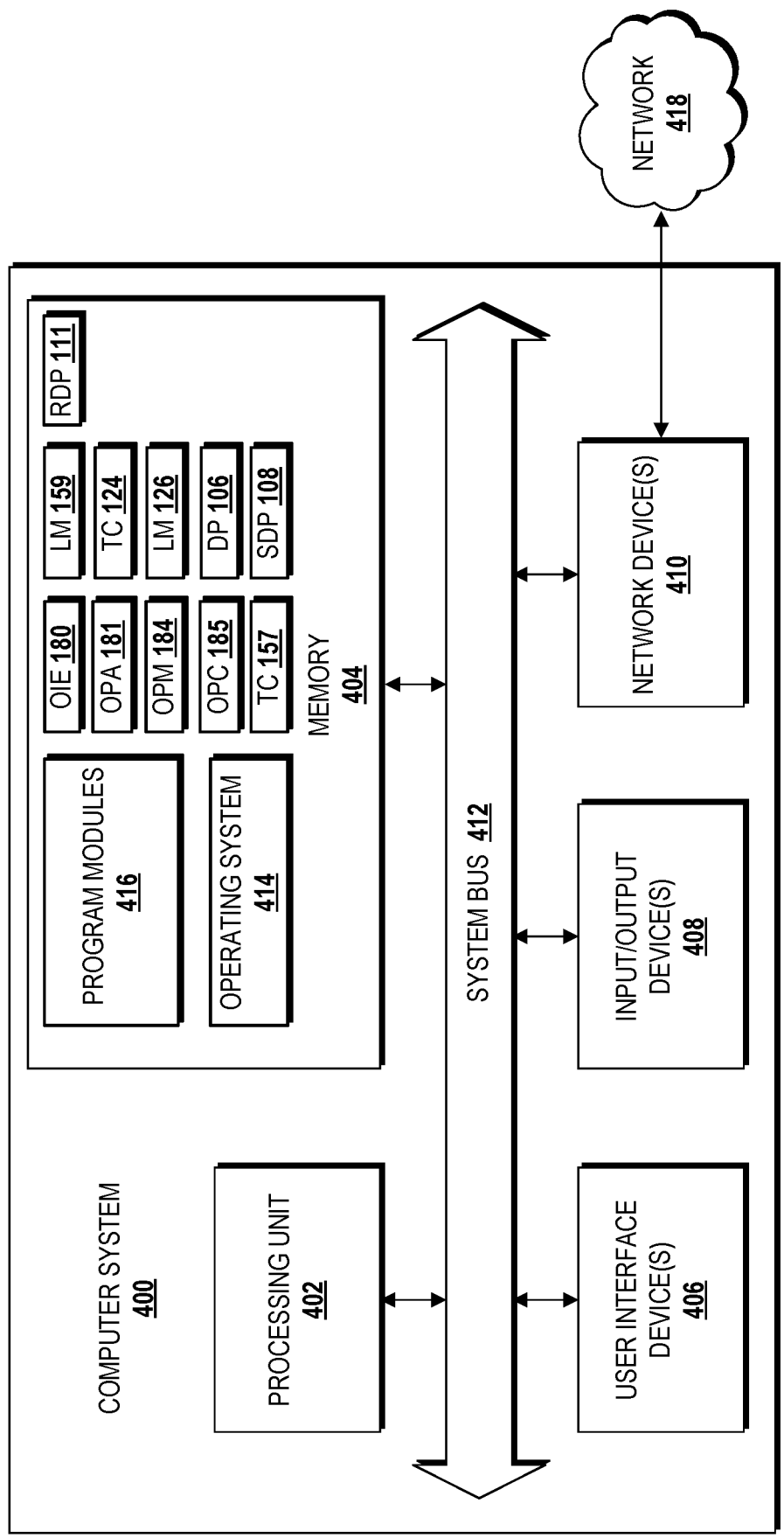
FIG. 4 is a block diagram illustrating an example computer system according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, at least a portion of one or more of the first network element 114, the second network element 150, the network access point 112, the optical network terminal 192, and/or the network management system 188 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include an analysis module that is embedded within one or more of the controllers 122, 158. These and/or other programs can be embodied in computer-readable media containing instructions that, when executed by the processing unit 402, in some embodiments, may perform and/or facilitate performance of one or more of the method 200 and the method 210 described in detail above with respect to FIGS. 2A and 2B, as well as operations discussed with respect to FIG. 1. According to some embodiments, the program modules 416 may be embodied in hardware, software, firmware, or any combination thereof. Although not shown in FIG. 4, it should be understood that the memory 404 also can be configured to store data, such as but not limited to, the optical interruption event 180, the optical protocol alarm 181, the optical protocol message 184, the optical transmission command 185, the transmission configuration 157, the latency mapping 159, the transmission configuration 124, the latency mapping 126, the data package 106, the subsequent data package 108, the reassembled data package 111, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 110). Examples of the network devices 410 include, but are not limited to, a modem, a radio frequency ("RF") or infrared ("IR") transceiver, a telephonic interface, a bridge, a network interface, an optical terminal, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, and/or additionally, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, an MBSF network, an optical transport network, a combination thereof, or any other mobile network and/or wireline network.

Figure 5:
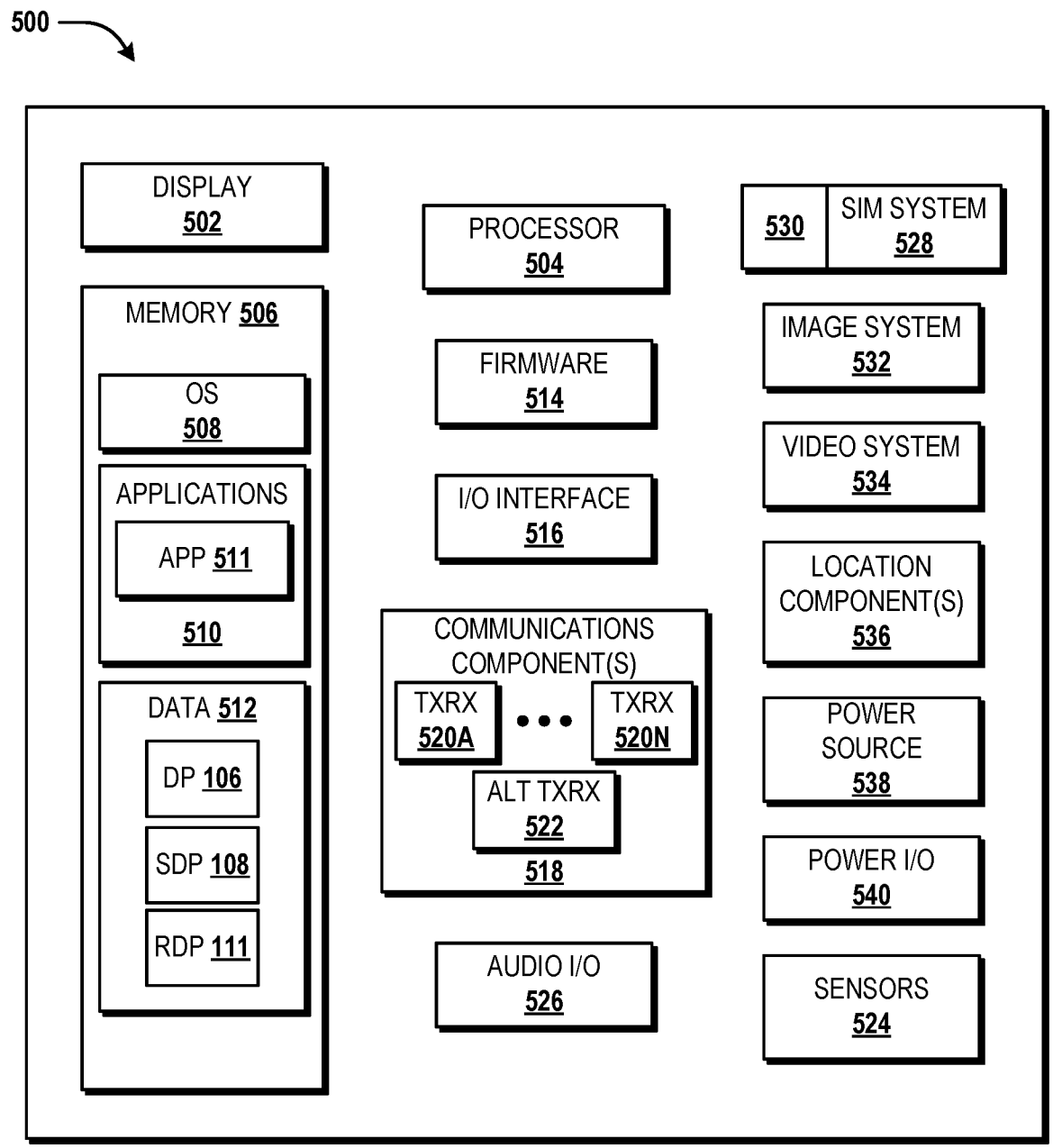
FIG. 5 is a block diagram illustrating an example mobile device capable of implementing aspects of a system according to embodiments of the concepts and technologies described herein.

Turning now to FIG. 5, an illustrative mobile device 500 and components thereof will be described. In some embodiments, one or more of the user equipment 104, 194 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing content provided across the network 110, entering/deleting data, entering and setting local credentials (e.g., user IDs and passwords) for device access, configuring settings, manipulating address book content and/or settings, multimode interaction, interacting with other applications 510 (e.g., a video playback application 511), and otherwise facilitating user interaction with the operating system 508, the applications 510, and/or other types or instances of data 512 that can be stored at the mobile device 500. The data 512 can include, for example, one or more identifiers and/or data packages, and/or other applications or program modules. In some embodiments, the data 512 can include one or more of the data package 106, the subsequent data package 108, the reassembled data package 111, and/or other data sent among and/or between the user equipment 104 and the user equipment 194. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE") in licensed spectrum and unlicensed spectrum, and various other 2G, 2.5G, 3G, 4G, 5G and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Based on the foregoing, it should be appreciated that concepts and technologies directed to multi-lane optical transport network recovery have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   detecting, by a multi-lane optical transceiver, an optical interruption event corresponding to an optical lane within a multi-lane optical path, wherein the multi-lane optical path comprises the optical lane corresponding to the optical interruption event and a plurality of optical lanes that do not correspond to the optical interruption event;
   instantiating, by the multi-lane optical transceiver, an optical protocol alarm based on the optical interruption event;
   generating, by the multi-lane optical transceiver, an optical protocol message based on the optical protocol alarm; and
   instructing, by the multi-lane optical transceiver via the optical protocol message, a peer multi-lane optical transceiver to alter optical transmission along the multi-lane optical path by
      throttling bandwidth of the multi-lane optical path to below a bandwidth minimum threshold while maintaining connection along the multi-lane optical path by routing data through the plurality of optical lanes that do not correspond with the optical interruption event,
      maintaining power to an optical transmitter corresponding to the optical lane that corresponds with the optical interruption event while not routing data through the optical lane corresponding with the optical interruption event so as to determine whether the optical interruption event is occurring due to the optical transmitter or due to the optical lane corresponding with the optical interruption event within the multi-lane optical path, and
      routing power to a reserve optical transmitter to activate the reserve optical transmitter so as to provide optical transmission along a reserve optical lane using a wavelength that was associated with the optical lane corresponding with the optical interruption event.

2. The method of claim 1, wherein the optical protocol message instructs the peer multi-lane optical transceiver to update a latency mapping stored on a controller communicatively coupled to the peer multi-lane optical transceiver.

3. The method of claim 1, wherein the detecting the optical interruption event includes determining that a data transmission via the optical lane is interrupted for at least a time period.

4. The method of claim 1, wherein the detecting the optical interruption event includes determining that the wavelength is not detected for the optical lane from the multi-lane optical path.

5. The method of claim 1, wherein the optical protocol message comprises an optical transmission command that alters a transmission configuration implemented by the peer multi-lane optical transceiver.

6. The method of claim 1, wherein the optical protocol alarm comprises at least one of a description of the optical interruption event, an identifier of the multi-lane optical transceiver, an identifier of the optical lane corresponding to the optical interruption event, an amount of bandwidth provided by the optical lane corresponding to the optical interruption event, or an indication of whether the optical protocol message was generated in response to the optical interruption event.

7. The method of claim 1, further comprising providing the optical protocol alarm to a network management system.

8. A multi-lane optical transceiver comprising:
   a transmitter optical sub-assembly;
   a receiver optical sub-assembly; and
   a controller comprising a processor and a memory that stores computer-executable instructions that, in response to execution by the processor, cause the processor to perform operations comprising:
      detecting an optical interruption event corresponding to an optical lane within a multi-lane optical path, wherein the multi-lane optical path comprises the optical lane corresponding to the optical interruption event and a plurality of optical lanes that do not correspond to the optical interruption event,
      instantiating an optical protocol alarm based on the optical interruption event,
      generating an optical protocol message based on the optical protocol alarm, and
      instructing, via the optical protocol message, a peer multi-lane optical transceiver to alter optical transmission along the multi-lane optical path by
         throttling bandwidth of the multi-lane optical path to below a bandwidth minimum threshold while maintaining connection along the multi-lane optical path by routing data through the plurality of optical lanes that do not correspond with the optical interruption event,
         maintaining power to an optical transmitter corresponding to the optical lane that corresponds with the optical interruption event while not routing data through the optical lane corresponding with the optical interruption event so as to determine whether the optical interruption event is occurring due to the optical transmitter or due to the optical lane corresponding with the optical interruption event within the multi-lane optical path, and routing power to a reserve optical transmitter to activate the reserve optical transmitter so as to provide optical transmission along a reserve optical lane using a wavelength that was associated with the optical lane corresponding with the optical interruption event.

9. The multi-lane optical transceiver of claim 8, wherein the optical protocol message instructs the peer multi-lane optical transceiver to update a latency mapping stored on the controller of the peer multi-lane optical transceiver.

10. The multi-lane optical transceiver of claim 8, wherein the detecting the optical interruption event includes determining that a data transmission via the optical lane is interrupted for at least a time period.

11. The multi-lane optical transceiver of claim 8, wherein the detecting the optical interruption event includes determining that the wavelength is not detected for the optical lane from the multi-lane optical path.

12. The multi-lane optical transceiver of claim 8, wherein the optical protocol message comprises an optical transmission command that alters a transmission configuration implemented by the peer multi-lane optical transceiver.

13. The multi-lane optical transceiver of claim 8, wherein the optical protocol alarm comprises at least one of a description of the optical interruption event, an identifier of the multi-lane optical transceiver, an identifier of the optical lane corresponding to the optical interruption event, an amount of bandwidth provided by the optical lane corresponding to the optical interruption event, or an indication of whether the optical protocol message was generated in response to the optical interruption event.

14. The multi-lane optical transceiver of claim 8, wherein the operations further comprise providing the optical protocol alarm to a network management system.

15. A computer storage medium having computer-executable instructions stored thereon that, in response to execution by a processor of a multi-lane optical transceiver, cause the processor to perform operations comprising:
    detecting an optical interruption event corresponding to an optical lane within a multi-lane optical path, wherein the multi-lane optical path comprises the optical lane corresponding to the optical interruption event and a plurality of optical lanes that do not correspond to the optical interruption event;
    instantiating an optical protocol alarm based on the optical interruption event;
    generating an optical protocol message based on the optical protocol alarm; and
    instructing, via the optical protocol message, a peer multi-lane optical transceiver to alter optical transmission along the multi-lane optical path by
        throttling bandwidth of the multi-lane optical path to below a bandwidth minimum threshold while maintaining connection along the multi-lane optical path by routing data through the plurality of optical lanes that do not correspond with the optical interruption event,
        maintaining power to an optical transmitter corresponding to the optical lane associated that corresponds with the optical interruption event while not routing data through the optical lane corresponding with the optical interruption event so as to determine whether the optical interruption event is occurring due to the optical transmitter or due to the optical lane corresponding with the optical interruption event within the multi-lane optical path, and
        routing power to a reserve optical transmitter to activate the reserve optical transmitter so as to provide optical transmission along a reserve optical lane using a wavelength that was associated with the optical lane corresponding with the optical interruption event.

16. The computer storage medium of claim 15, wherein the optical protocol message instructs the peer multi-lane optical transceiver to update a latency mapping stored on a controller communicatively coupled to the peer multi-lane optical transceiver.

17. The computer storage medium of claim 15, wherein the detecting the optical interruption event includes determining that a data transmission via the optical lane is interrupted for at least a time period.

18. The computer storage medium of claim 15, wherein the detecting the optical interruption event includes determining that the wavelength is not detected for the optical lane from the multi-lane optical path.

19. The computer storage medium of claim 15, wherein the optical protocol alarm comprises at least one of a description of the optical interruption event, an identifier of the multi-lane optical transceiver, an identifier of the optical lane corresponding to the optical interruption event, an amount of bandwidth provided by the optical lane corresponding to the optical interruption event, or an indication of whether the optical protocol message was generated in response to the optical interruption event.

20. The computer storage medium of claim 15, wherein the operations further comprise providing the optical protocol alarm to a network management system.

* * * * *